United States Patent
Zhang et al.

(10) Patent No.: US 8,059,395 B2
(45) Date of Patent: Nov. 15, 2011

(54) MOUNTING APPARATUS AND ELECTRONIC DEVICE INCORPORATING THE SAME

(75) Inventors: Guang-Yi Zhang, Shenzhen (CN); Xiao-Zheng Li, Shenzhen (CN); De-Yi Shi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 104 days.

(21) Appl. No.: 12/727,243

(22) Filed: Mar. 19, 2010

(65) Prior Publication Data

US 2011/0128693 A1    Jun. 2, 2011

(30) Foreign Application Priority Data

Nov. 27, 2009   (CN) .......................... 2009 1 0310534

(51) Int. Cl.
*H05K 5/00* (2006.01)
*A47B 81/00* (2006.01)
*A47F 7/00* (2006.01)

(52) U.S. Cl. ......... 361/679.33; 361/679.35; 361/679.36; 361/679.37; 361/679.38; 361/679.39; 361/679.43; 361/679.44; 312/223.1; 312/223.2; 211/26

(58) Field of Classification Search .. 361/679.31–679.4, 361/679.55–679.6, 724–727; 211/26; 312/223.1, 312/223.2; 439/157, 60, 151–160, 327, 328, 439/331, 638; 369/75.11, 75.21, 76, 77.11, 369/77.21, 78, 79, 80, 81, 82; 29/37

See application file for complete search history.

(56) References Cited

U.S. PATENT DOCUMENTS

| | | | |
|---|---|---|---|
| 2005/0057895 A1* | 3/2005 | Chen et al. | 361/685 |
| 2007/0019379 A1* | 1/2007 | Hsiao | 361/685 |
| 2009/0073649 A1* | 3/2009 | Ikeda et al. | 361/679.35 |

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

A mounting apparatus for attaching a data storage device to a chassis includes a latching member, first and second elastic members and a button. The latching member defines a through hole therein and forms a latching pin at a first end thereof. The button includes an abutting portion and a pressing portion extending up from the abutting portion. When the mounting apparatus is mounted to the chassis, the button is placed on a bottom side of the latching member, the latching member is movably mounted to the chassis, the first elastic member is compressed between the second end of the latching member and a baffle formed on the chassis, the second elastic member is compressed between the button and the chassis, the pressing portion of the button extends through the through hole and extending out of a top surface of the latching member.

20 Claims, 8 Drawing Sheets

MOUNTING APPARATUS AND ELECTRONIC DEVICE INCORPORATING THE SAME

BACKGROUND

1. Technical Field

The disclosure generally relates to mounting apparatuses, and particularly to a mounting apparatus which facilitates attachment of a data storage device to an electronic device.

2. Description of Related Art

Data storage devices, such as hard disk drives (HDDs), compact disk-read only memory (CD-ROM) drives and digital video disc-read only memory (DVD-ROM) drives, are typically secured to a chassis of an electronic device with screws. However, attaching and detaching the data storage device with screws is unduly laborious and time-consuming.

What is desired, therefore, is a mounting apparatus for readily attaching or detaching a data storage device to or from a chassis of an electronic device.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

Figure 1:
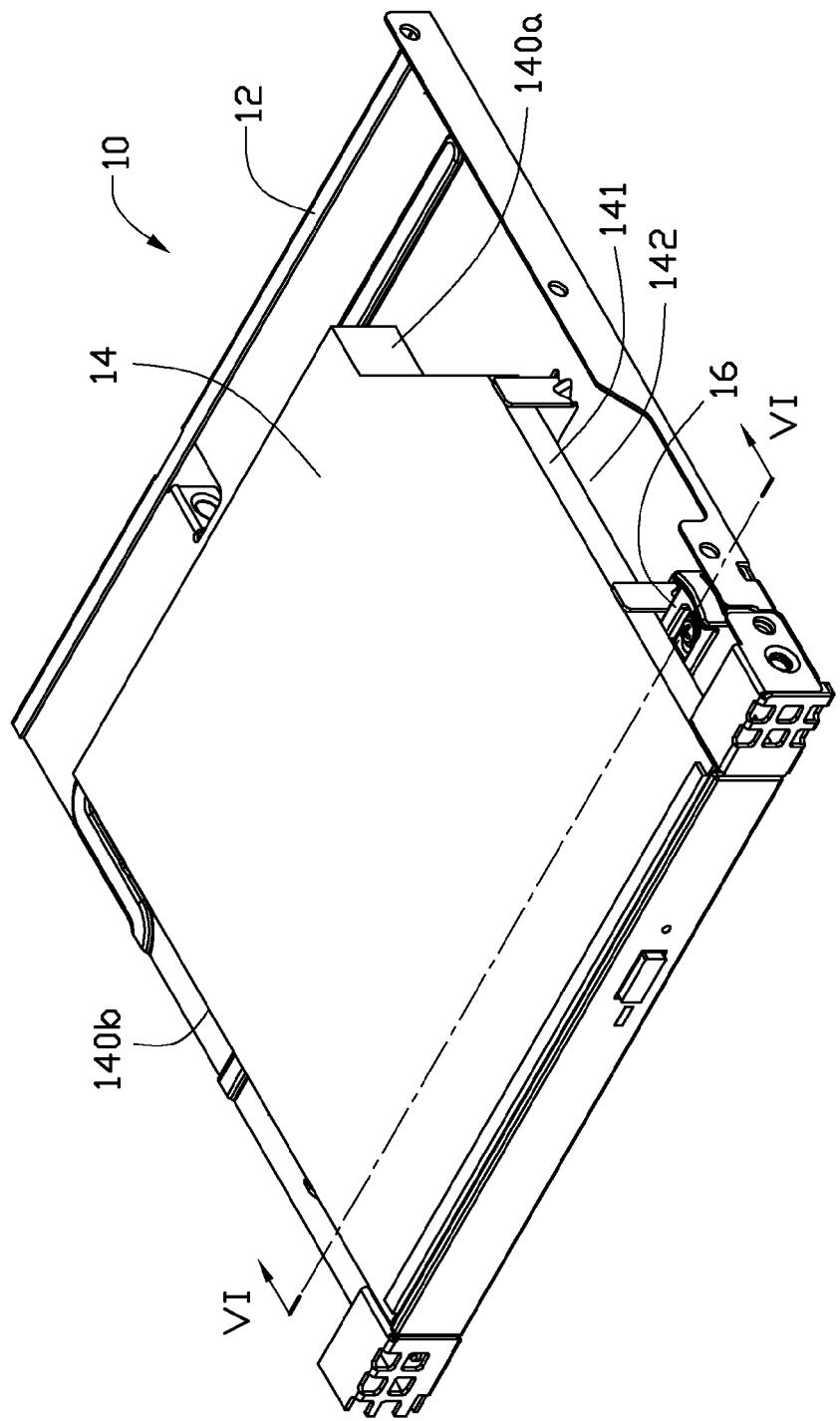
FIG. 1 is an assembled, isometric view of an electronic device in accordance with an exemplary embodiment of the present disclosure.

Referring to FIG. 1, an electronic device 10 according to an exemplary embodiment of the present disclosure includes a chassis 12, a data storage device 14, and a mounting apparatus 16 for mounting the data storage device 14 to the chassis 12.

Figure 2:
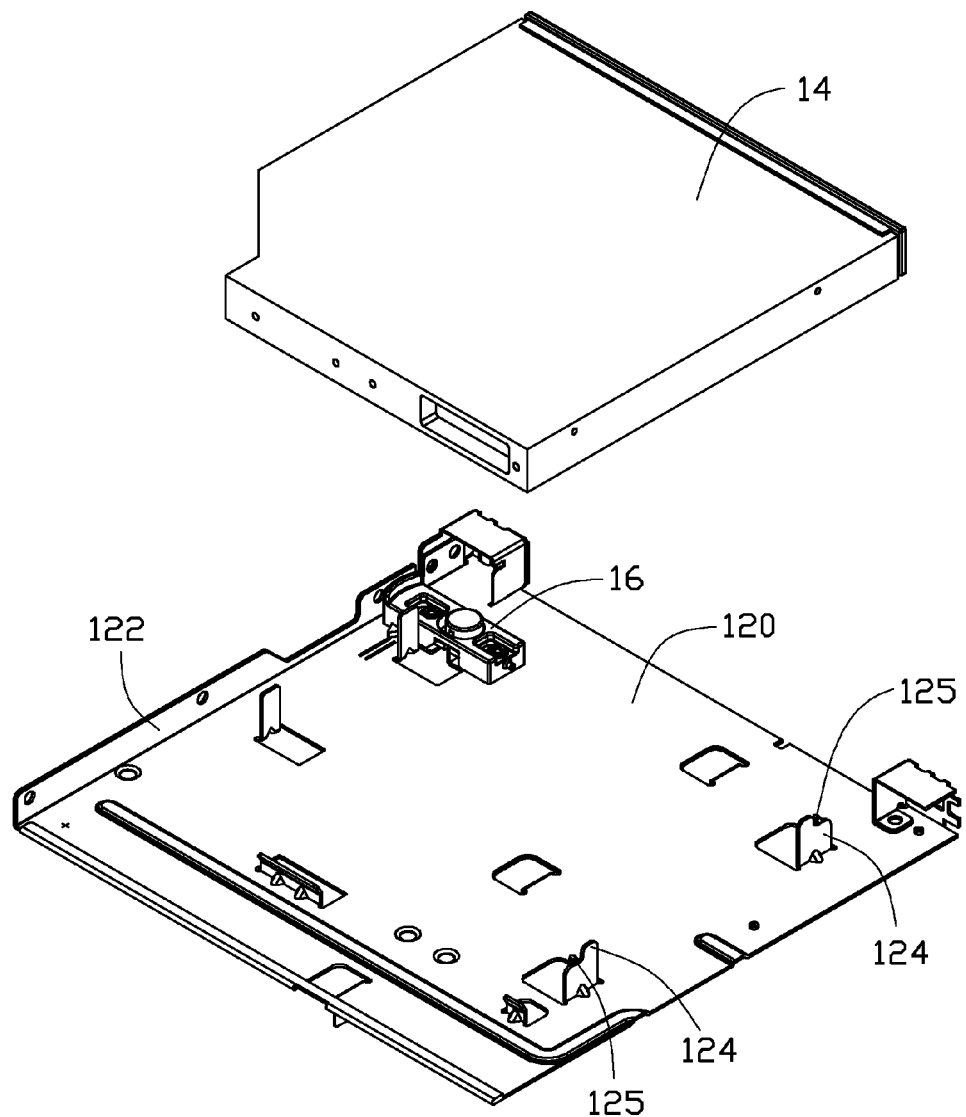
FIG. 2 is a partially exploded, isometric view of the electronic device of FIG. 1, viewed from different aspect.

Referring to FIG. 2, the chassis 12 includes a base plate 120, a side plate 122 extending vertically and up from a left side of the base plate 120, and two positioning sheets 124 formed on the base plate 120. The side plate 122 of the chassis 12 forms a clasp 1221 (see in FIG. 6) on an inner surface thereof facing the two positioning sheets 124. The two positioning sheets 124 are coplanar and parallel to the side plate 122 and spaced from each other. Each positioning sheet 124 forms a hook 125 at a top end thereof. The hook 125 extends from a middle portion of the top end of the positioning sheet 124 toward the side plate 122.

Figure 3:
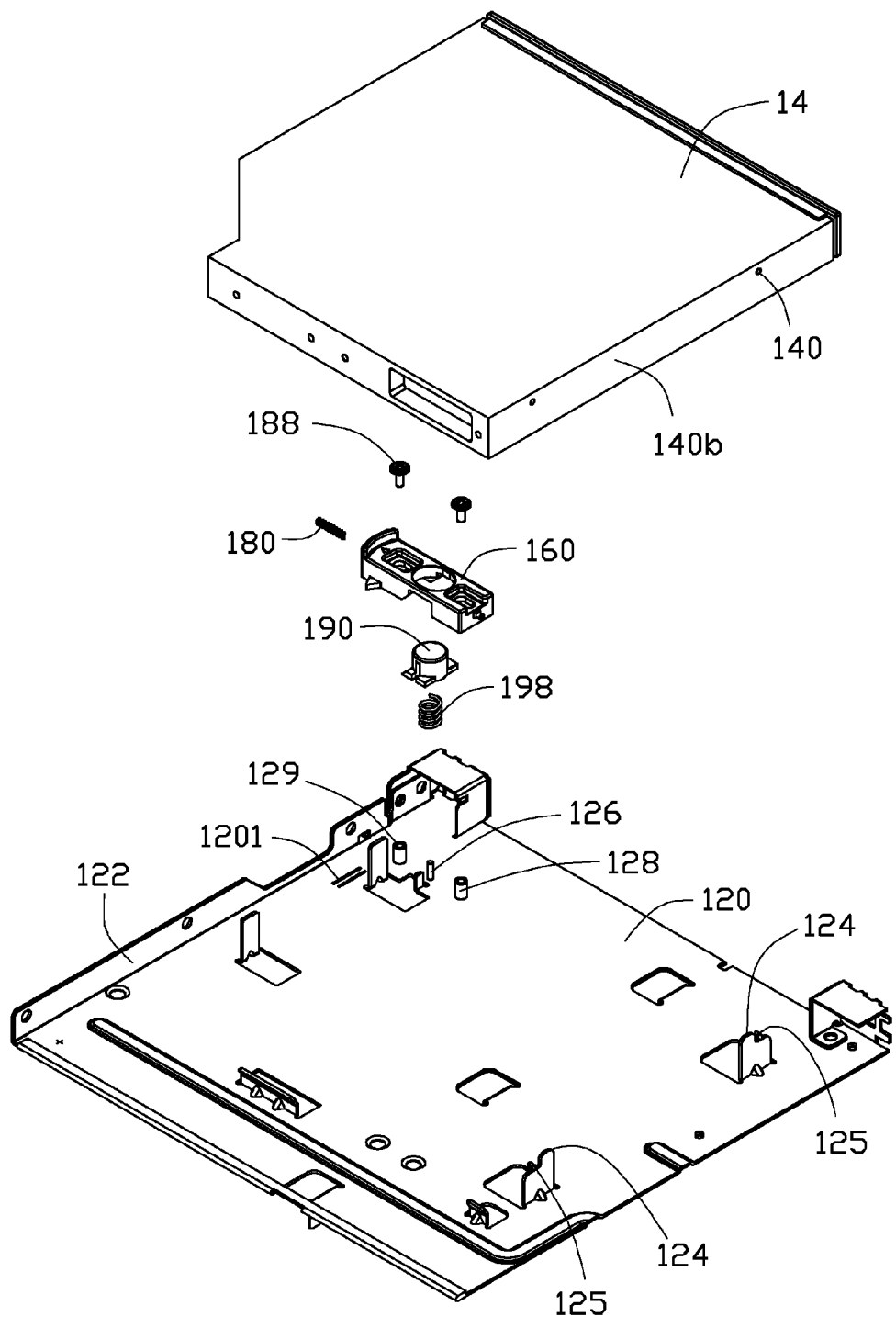
FIG. 3 is a further exploded, isometric view of the electronic device of FIG. 2.

Referring also to FIG. 3, a positioning post 126 is formed on the chassis 12 and located adjacent to the side plate 122. The chassis 12 further forms two guiding posts 128. The two guiding posts 128 are arranged symmetrically at two opposite sides of the positioning post 126. The guiding posts 128 and the positioning post 126 are aligned with the hook 125 of one of the two positioning sheets 124. Each guiding post 128 is column-shaped and axially defines a fixing hole 129 therein.

Referring back to FIG. 1, the data storage device 14 is disposed on the chassis 12 and arranged between the two positioning sheets 124 and the mounting apparatus 16. The data storage device 14 can be a CD-ROM drive or another electronic component, such as a HDD or a DVD-ROM drive. The data storage device 14 is a substantially rectangular box. The data storage device 14 has a first lateral surface 140a at a right side thereof and an opposite second lateral surface 140b at a left side thereof. A flange 141 extends horizontally and right (as viewed in FIG. 1) from a top portion of the first lateral surface 140a of the data storage device 14. The flange 141 and the first lateral surface 140a cooperatively define a recess 142 (particularly see in FIG. 5) therebetween. The first lateral surface 140a defines a latching hole 146 (see in FIG. 5) therein at a position corresponding to the mounting apparatus 16. When the data storage device 14 is mounted to the chassis 12, the flange 141 of the data storage device 14 covers a portion of the mounting apparatus 16. The second lateral surface 140b of the data storage device 14 defines two locking holes 140 therein corresponding to the hooks 125 of the two positioning sheets 124.

Figure 4:
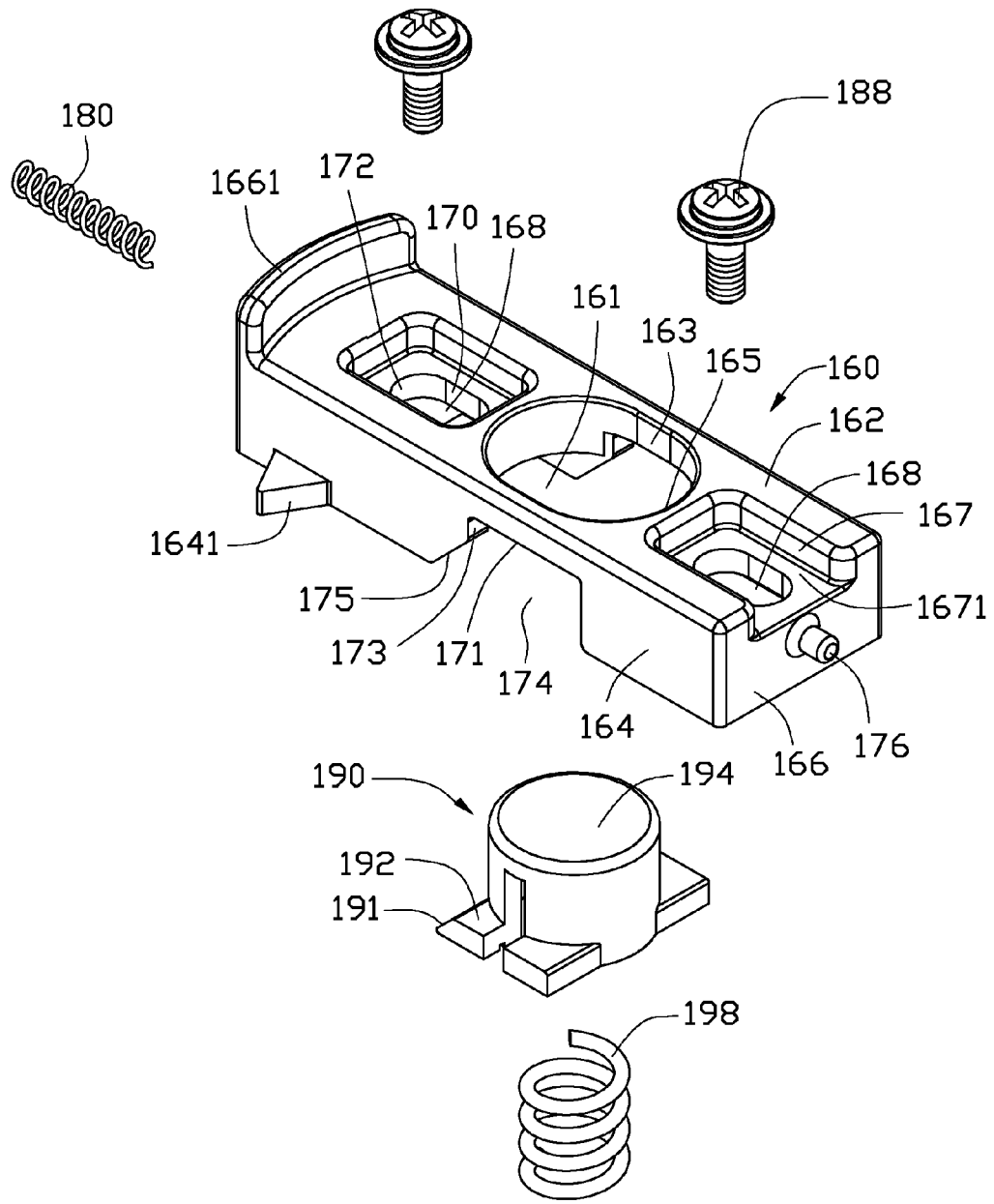
FIG. 4 is an enlarged view of a mounting apparatus of the electronic device of FIG. 3.
Figure 5:
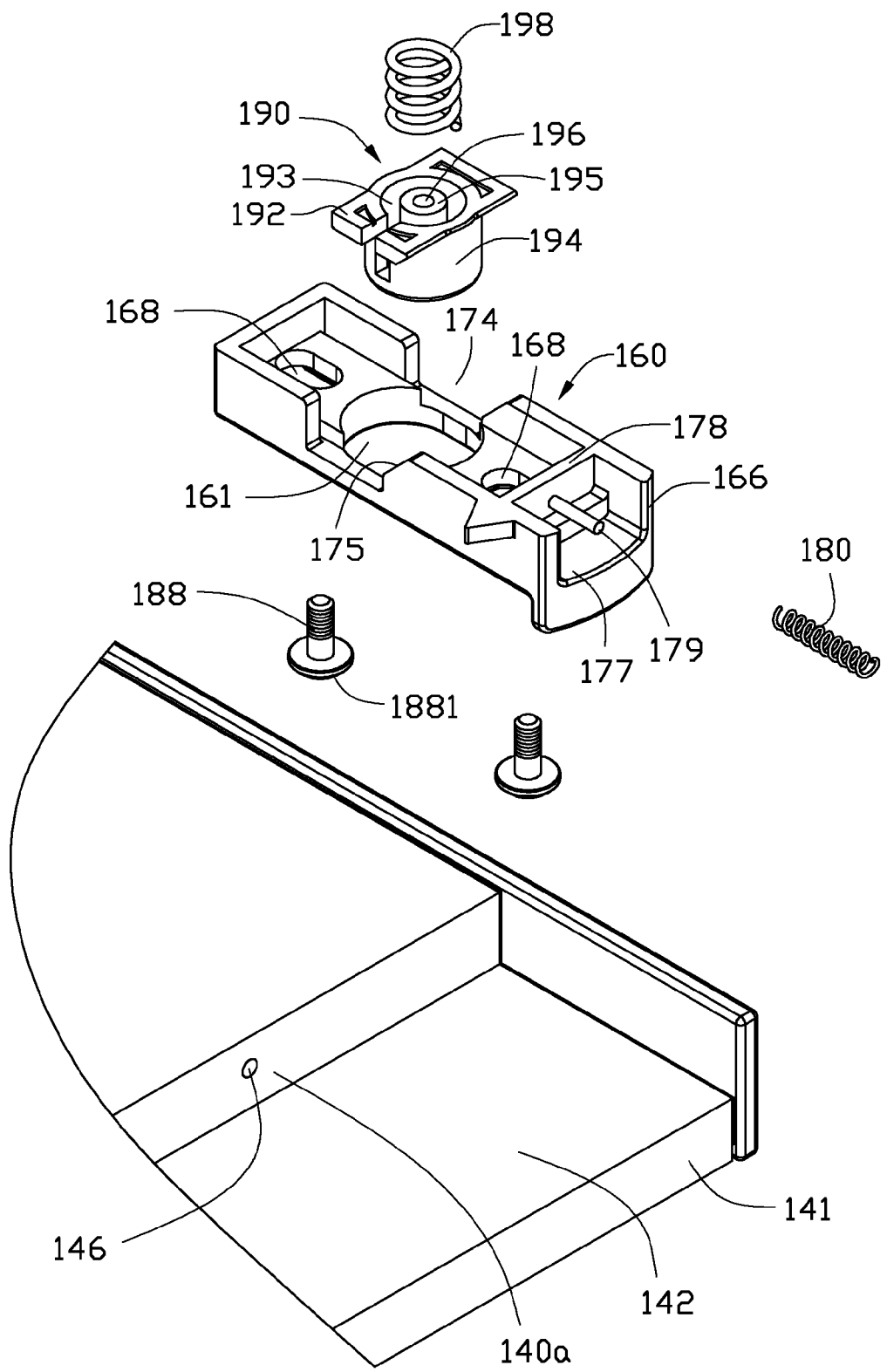
FIG. 5 is an inverted, partial, enlarged view of the electronic device of FIG. 3, with a chassis of the electronic device being omitted.

Referring to FIGS. 4-5, the mounting apparatus 16 includes an elongated latching member 160, a first elastic member 180, a button 190, and a second elastic member 198.

The latching member 160 includes a substantially rectangular top wall 162, two opposite first sidewalls 164 at opposite lateral sides of the top wall 162, and two opposite second sidewalls 166 (i.e., a left second sidewall 166 and a right second sidewall 166) extending down form opposite edges of the top wall 162. A through hole 161 is defined at a middle portion of the top wall 162 and vertically extends through the top wall 162. An inner surface of the latching member 160, surrounding the through hole 161, has two opposite straight sections 163 and two opposite curved sections 165. The two opposite straight sections 163 are located at front and rear sides of the through hole 161 and are parallel to the first sidewalls 164 of the latching member 160. The two opposite curved sections 165 are located at left and right sides of the through hole 161 and are connected between the two opposite straight sections 163. Each curved section 165 has a semicircular shape.

Two rectangular recesses 167 are defined in a top surface of the top wall 162 and are located at left and right sides of the through hole 161. Two steps 1671 are formed at bottoms of the two recesses 167, respectively. An elongated guiding hole 168 vertically extends through a middle of each step 1671 of the latching member 160. The two guiding holes 168 are arranged symmetrically at two opposite sides of the through hole 161. Each guiding hole 168 has a configuration similar to the through hole 161, and has a size smaller than that of the through hole 161. An inner surface surrounding each guiding hole 168 has two opposite straight sections 170 and two opposite curved sections 172. The two opposite straight sections 170 are located at front and rear sides of the guiding hole 168 and parallel to the two first sidewalls 164 of the latching member 160. The two opposite curved sections 172 are located at left and right sides of the guiding hole 168 and connected between the two opposite straight sections 170. Each curved section 172 has a semicircular shape. A diameter of the curved section 172 is substantially the same as that of the guiding post 128. A horizontal distance between the center of the through hole 161 and the center of each guiding hole 168 is equal to a horizontal distance between the center of the positioning post 126 and the center of the corresponding guiding post 128.

A cutout 174 is defined in a low portion of the latching member 160 at a position corresponding to the through hole 161 of the top wall 162. The cutout 174 extends along the longitudinal direction of the chassis 12 and through the two first sidewalls 164. The cutout 174 is defined by a horizontal top edge 171, two vertical edges 173 extending down from left and right ends of the horizontal top edge 171, and an inclined guiding edge 175 extending down and left (as viewed in FIG. 4) form a bottom end of a left vertical edge 173.

The latching member 160 forms a column-shaped latching pin 176 on an outer surface of the right second sidewall 166. An operating portion 1661 extends up from a top end of the left second sidewall 166 of the latching member 160. The left second sidewall 166 defines a cutout 177 (see in FIG. 5) therethrough. A connecting wall 178 (see in FIG. 5) extends down from a bottom surface of the top wall 162. The connecting wall 178 is located between a left guiding hole 168 and the left second sidewall 166, and is connected between the two first sidewalls 164. The connecting wall 178, the two first sidewalls 164 and the top wall 162 cooperatively define a receiving space therebetween. The connecting wall 178 forms a column-shaped guiding pin 179 on an outer surface thereof facing the cutout 177. The guiding pin 179 is received in the receiving space defined by the connecting wall 178, the two first sidewalls 164, and the top wall 162. In assembly, the first elastic member 180, such as a coil spring, is disposed around the guiding pin 179. One end of the first elastic member 180 abuts against the connecting wall 178, while the other end of the elastic member 180 extends out beyond the left second sidewall 166 through the cutout 177.

The button 190 includes a rectangular abutting portion 192 and a column-shaped pressing portion 194 extending up and vertically from a middle of a top of the abutting portion 192. A size of the through hole 161 of the latching member 160 is larger than that of the pressing portion 194 and smaller than that of the abutting portion 192. The abutting portion 192 forms an inclined abutting edge 191 at one side thereof facing the inclined guiding edge 175 of the latching member 160. The abutting edge 191 is parallel to the guiding edge 175 of the latching member 160. An annular receiving groove 193 is axially defined in a middle of a bottom surface of the button 190 and extends into the pressing portion 194, thereby forming a column-shaped guiding pole 195 (see in FIG. 5) in a middle of the annular receiving groove 193. The guiding pole 195 axially defines a receiving hole 196 therein. The receiving hole 196 is slightly larger than the positioning post 126 of the chassis 12. In assembly, the second elastic member 198, such as a coil spring, is received in the receiving groove 193 and disposed around the guiding pole 195 of the button 190. One end of the second elastic member 198 abuts against an inner surface of the button 190, while the other end of the second elastic member 198 extends down beyond the bottom surface of the button 190.

Figure 6:
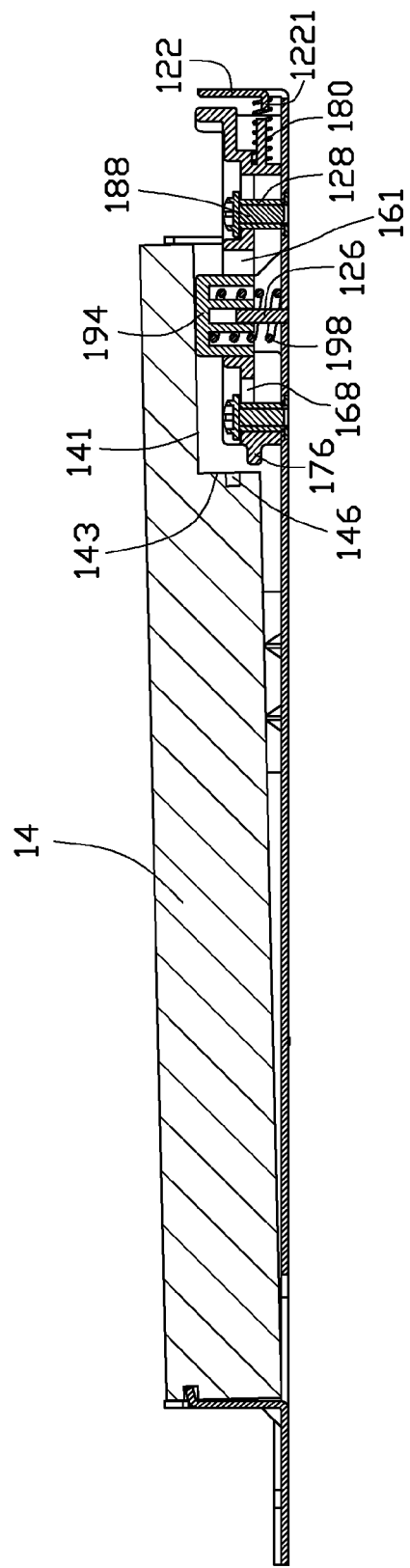
FIG. 6 is a cross-sectional view of the electronic device of FIG. 1 illustrating the mounting apparatus not yet being latched, taken along line VI-VI thereof.

Referring also to FIG. 6, in assembly of the mounting apparatus 16 to the chassis 12, the button 190 is placed on a bottom side of the latching member 160, and the pressing portion 194 of the button 190 extends through the through hole 161 and extends out of the top surface of the latching member 160. The second elastic member 198 is received in the receiving groove 193 and disposed around the guiding pole 195 of the button 190, with a bottom end thereof extending out of the receiving groove 193. The first elastic member 180 is disposed around the guiding pin 179, with an outer end thereof extending out beyond the corresponding second sidewall 166. The mounting apparatus 16 is attached to the chassis 12, with the positioning post 126 aligning with the receiving hole 196 of the button 190, the two guiding posts 128 respectively aligning with the two guiding holes 168 of the latching member 160, and the first elastic member 180 is compressed between the latching member 160 and the side plate 122 of the chassis 12. The side plate 122 functions as a baffle for blocking the first elastic member 180. The outer end of the first elastic member 180 receives the clasp 1221 of the side plate 122 therein. The mounting apparatus 16 is pressed down to compress the second elastic member 198 between the button 190 of the mounting apparatus 16 and the base plate 120 of the chassis 12, thereby allowing the positioning post 126 to enter the receiving hole 196 and allowing the two guiding posts 128 to enter the two guiding holes 168 of the latching member 160. Then, two screws 188 are provided and respectively threadedly engaged in the fixing holes 129 of the two guiding posts 128, to sandwich the button 190 between the chassis 12 and the latching member 160. A distance between the two opposite straight sections 170 is slightly larger than a diameter of the guiding post 128 and smaller than a diameter of a head 1881 of the screw 188. Therefore, the guiding posts 128 and the screws 188 cooperatively limit a vertical movement of the latching member 160 and allow the latching member 160 to move left and right relative to the two guiding posts 128 along the latitudinal direction of the chassis 12.

During mounting the latching member 160 to the chassis 12, the compressed second elastic member 198 is gradually restored to push the button 190 up toward the latching member 160 until the abutting portion 192 thereof moves to an upper portion of the cutout 174 to abut against the top edge 171. The latching member 160 is pushed toward the first elastic member 180 by the abutting portion 192 of the moving button 190, to thereby further compress the first elastic member 180.

Referring to FIG. 6, before the data storage device 14 being assembled to the chassis 12, the first elastic member 180 is compressed between the connecting wall 178 of the latching member 160 and the side plate 122 of the chassis 12. The pressing portion 194 of the button 190 abuts against one of the two curved sections 165 which is located adjacent to the latching pin 176. The abutting portion 192 of the button 190 abuts against the top edge 171 and one of the two vertical edges 173, which connects the guiding edge 175. Each guiding post 128 abuts against one of the two curved sections 172 at a corresponding guiding hole 168, which is located adjacent to the latching pin 176.

Figure 7:
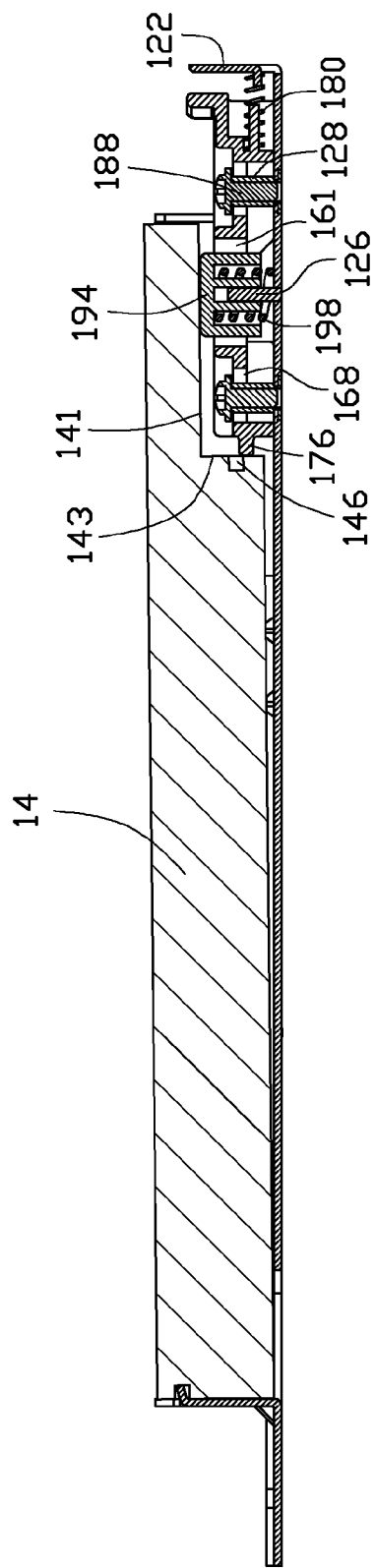
FIG. 7 is similar to FIG. 6, but shows a state of the mounting apparatus during latching.
Figure 8:
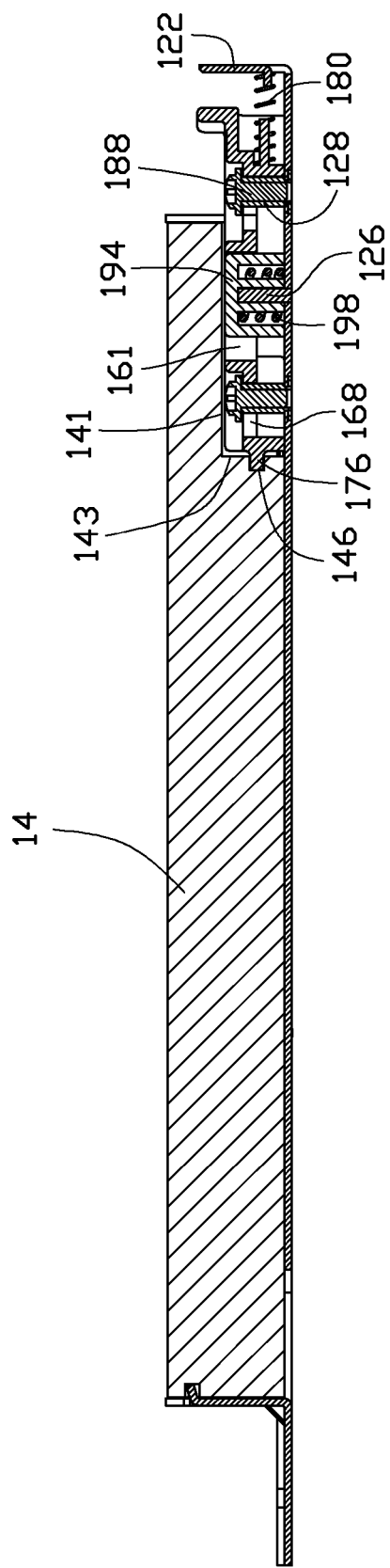
FIG. 8 is similar to FIG. 6, but shows the mounting apparatus having been latched in the electronic device.

Referring also to FIGS. 7-8, in assembly of the data storage device 14 to the chassis 12, the data storage device 14 is placed aslant on the chassis 12, with the two locking holes 140 in the second lateral surface 140b thereof receiving the hooks 125 of the two positioning sheets 124 therein. The flange 141 of the data storage device 14 covers the button 190 of the mounting apparatus 16 and is supported by the button 190. The first lateral surface 140a of the data storage device 14 is spaced from an outer end of the latching pin 176. Then, the flange 141 of the data storage device 14 is pressed down for driving the button 190 to move down, causing the abutting portion 192 of the button 190 to disengage from the upper portion of the cutout 174 and slide along the guiding edge 175 of the latching member 160. At the same time, the compressed first elastic member 180 is gradually restored to push the latching member 160 toward the first lateral surface 140a of the data storage device 14. The latching member 160 moves relative to the guiding posts 128 of the chassis 12, causing the curved sections 172 at a side of each guiding hole 168 adjacent to the latching pin 176 to disengage from the guiding posts 128.

After the flange 141 of the data storage device 14 moved down a certain distance, the latching pin 176 is pushed to abut against the first lateral surface 140a of the data storage device 14. When the data storage device 14 is pressed to a horizontal state, the latching pin 176 slides into and engages with the latching hole 146 of the data storage device 14, thereby mounting the data storage device 14 to the chassis 12. At that time, the pressing portion 194 of the button 190 abuts against the curved section 165 adjacent to the second elastic member 180. The abutting portion 192 of the button 190 abuts against the guiding edge 175. Each guiding post 128 abuts against a curved section 172 at a side of a corresponding guiding hole 168, which is located adjacent to the second elastic member 180.

To detach the data storage device 14 from the chassis 12, the operating portion 1661 of the latching member 160 is pulled toward the side plate 122 to compress the first elastic member 180. The latching member 160 slides relative to the guiding posts 128, causing the latching pin 176 to disengage from the latching hole 146 of the data storage device 14. Then, the compressed second elastic member 198 is gradually restored to push the button 190 up toward the flange 141 of the data storage device 14. The flange 141 of the data storage device 14 is pushed up by the pressing portion 194 of the button 190. At that time, the data storage device 14 can be detached form the chassis 12 easily by disengaging the locking holes 140 from the hooks 125 of the chassis 12. After removing the data storage device 14 form the chassis 12, the button 190 and the latching member 160 are automatically driven back to their original position by the restoring force of the second elastic member 198.

In the electronic device 10, due to the presence of the mounting apparatus 16, the data storage device 14 can be readily attached to the chassis 12 by pressing the data storage device 14 down and can also be readily detached from the chassis 12 by pulling the latching member 160. Further, a front first sidewall 164 of the latching member forms a triangular pointer 1641 (see in FIG. 4) on an outer surface thereof. The base plate 120 of the chassis 12 forms two indicating lines 1201 thereon corresponding to two different locations of the pointer 1641 (see in FIG. 3) at unlocked and locked states of the mounting apparatus 160. The pointer 1641 and the two indicating lines 1201 are cooperatively used for indicating the state of the mounting apparatus 16.

It is to be understood, however, that even though numerous characteristics and advantages of the present disclosure have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus, comprising:
    a latching member vertically defining a through hole therein, the latching member having a first end and a second end at two opposite sides of the through hole, the latching member forming a latching pin at the first end thereof, the latching member further defining a cutout in a low portion thereof corresponding to the through hole;
    a first elastic member;
    a second elastic member; and
    a button comprising an abutting portion and a pressing portion extending up from the abutting portion;
    wherein when the mounting apparatus is mounted to a chassis, the button is placed on a bottom side of the latching member, the latching member is movably mounted to the chassis, the first elastic member is compressed between the second end of the latching member and a baffle formed on the chassis, the second elastic member is compressed between the button and the chassis, the pressing portion of the button extends through the through hole and extends out of a top surface of the latching member, and the abutting portion of the button is received in an upper portion of the cutout of the latching member, and
    wherein when the button is pressed down, the abutting portion of the button disengages from the upper portion of the cutout of the latching member, and the compressed first elastic member is restored to push the latching member away from the first elastic member.

2. The mounting apparatus of claim 1, wherein the latching member comprises a substantially rectangular top wall, two opposite first sidewalls and two opposite second sidewalls extending down from a peripheral edge of the top wall, the through hole of the latching member being defined in the top wall, the latching pin being formed on one of the two opposite second sidewalls, the first elastic member being located at a position corresponding to the other one of the two opposite second sidewalls.

3. The mounting apparatus of claim 2, wherein the cutout of the latching member extends through the two opposite first sidewalls, the cutout being defined among a horizontal top edge, two vertical edges and an inclined guiding edge, the two vertical edges extending down from two ends of the horizontal top edge and being respectively located adjacent to the two opposite second sidewalls, the inclined guiding edge extending down form a bottom end of one of the two vertical edge which is located adjacent to the first elastic member and extends slantingly toward the first elastic member.

4. The mounting apparatus of claim 3, wherein the abutting portion of the button forms an inclined abutting edge at a side thereof facing the inclined guiding edge of the latching member.

5. The mounting apparatus of claim 1, wherein the through hole of the latching member is an elongated hole, an inner surface surrounding the through hole having two opposite straight sections at two opposite sides of the through hole corresponding to the two opposite first sidewalls and two opposite curved sections at the other two opposite sides of the through hole corresponding to the two opposite second sidewalls, the pressing portion of the button being column-shaped, each of the two curved sections having a semicircular shape.

6. The mounting apparatus of claim 5, wherein a distance between the two straight sections is bigger than a diameter of the pressing portion.

7. The mounting apparatus of claim 1, wherein two recesses are defined in top surface of the top wall and are located at two opposite sides of the through hole, two steps being respectively formed at bottoms of the two recesses, an elongated guiding hole being defined in and vertically extends though each of the two steps of the latching member.

8. The mounting apparatus of claim 7, wherein an inner surface surrounding each guiding hole has two opposite straight sections and two opposite curved sections, the two opposite straight sections being located at two opposite sides of the guiding hole corresponding to the two opposite first sidewalls of the latching member, the two opposite curved sections being located at the other two opposite sides of the guiding hole corresponding to the two opposite second sidewalls of the latching member.

9. The mounting apparatus of claim 1, wherein the latching member defines a receiving space at the second end thereof, a guiding pin being formed at the second end of the latching member and received in the receiving space, the first elastic member being a coil spring and disposed around the guiding pin.

10. An electronic device, comprising: a chassis comprising a base plate, a baffle and two positioning sheets formed on the base plate; a mounting apparatus mounted on the chassis and located adjacent to the baffle, the mounting apparatus comprising: a latching member vertically defining a through hole therein, the latching member having a first end adjacent to the two positioning sheets and an opposite second end adjacent to the baffle of the chassis, the latching member forming a latching pin at the first end thereof, the latching member further defining a cutout in a low portion thereof corresponding to the through hole; a first elastic member; a second elastic member; and a button comprising an abutting portion and a pressing portion extending up from the abutting portion, when the mounting apparatus is mounted to a chassis, the button is placed on a bottom side of the latching member, the latching member is movably mounted to the chassis, the first elastic member is compressed between the second end of the latching member and the baffle of the chassis, the second elastic member is compressed between the button and the chassis, the pressing portion of the button extends through the through hole and extending out of a top surface of the latching member, and the abutting portion of the button is received in an upper portion of the cutout of the latching member; and a data storage device disposed on the chassis, the data storage device having a first lateral side and an opposite second lateral side, the baffle being located at the first lateral side of the data storage device, the two positioning sheets being located at the opposite second lateral side of the data storage device and engaging with the opposite second lateral side of the data storage device, the first lateral side defining a latching hole therein at a position corresponding to the latching pin of the latching member of the mounting apparatus, a flange extending horizontally and out from a top portion of the first lateral side of the data storage device and covering the button of the mounting apparatus, wherein when the button is pressed down by the flange of the data storage device, the abutting portion of the button disengages from the upper portion of the cutout of the latching member, the compressed first elastic member is restored to push the latching member toward the data storage device, and the latching pin slides into and engages with the latching hole of the data storage device to mount the data storage device to the chassis.

11. The electronic device of claim 10, wherein the latching member comprises a substantially rectangular top wall, two opposite first sidewalls and two opposite second sidewalls extending down from a peripheral edge of the top wall, the through hole of the latching member being defined in the top wall, the latching pin being formed on one of the two opposite second sidewalls, the first elastic member being located at a position corresponding to the other one of the two opposite second sidewalls.

12. The electronic device of claim 11, wherein the cutout of the latching member extends through the two opposite first sidewalls, the cutout being defined among a horizontal top edge, two vertical edges and an inclined guiding edge, the two vertical edges extending down from two ends of the horizontal top edge and being respectively located adjacent to the two opposite second sidewalls, the inclined guiding edge extending down form a bottom end of one of the two vertical edge which is located adjacent to the first elastic member and extends slantingly toward the first elastic member.

13. The electronic device of claim 12, wherein the abutting portion of the button forms an inclined abutting edge at a side thereof facing the inclined guiding edge of the latching member.

14. The electronic device of claim 10, wherein the through hole of the latching member is an elongated hole, the pressing portion of the button being column-shaped.

15. The electronic device of claim 10, wherein an annular receiving groove is axially defined in a middle of a bottom surface of the button and extends into the pressing portion, a guiding pole being formed in a middle of the annular receiving groove, the second elastic member being received in the receiving groove and disposed around the guiding pole of the button.

16. The electronic device of claim 15, wherein the second elastic member being a coil spring.

17. The electronic device of claim 15, wherein the guiding pole axially defines a receiving hole therein, the chassis forming a positioning post thereon corresponding to the receiving hole of the guiding pole, the receiving hole of the guiding pole receiving the positioning post of the chassis therein.

18. The electronic device of claim 10, wherein two recesses are defined in top surface of the top wall and are located at two opposite sides of the through hole, two steps being respectively formed at bottoms of the two recesses, an elongated guiding hole being defined in and vertically extends though each of the two steps of the latching member the chassis forming two guiding posts thereon corresponding to the guiding holes of the latching member.

19. The electronic device of claim 10, wherein the latching member defines a receiving space at the second end thereof, a guiding pin being formed at the second end of the latching member and received in the receiving space, the first elastic member being a coil spring and disposed around the guiding pin.

20. The electronic device of claim 10, wherein a hook is formed on each of the two positioning sheets and extends toward the second lateral surface of the data storage device, the second lateral surface of the data storage device defines two locking holes therein corresponding to the hooks of the two positioning sheets, the hooks of the two positioning sheets being received in the two locking holes of the data storage device.

* * * * *